April 21, 1953  R. H. ZEILMAN  2,635,582
MANUAL CONTROL DEVICE WITH POWER BOOSTER
Filed Jan. 17, 1950
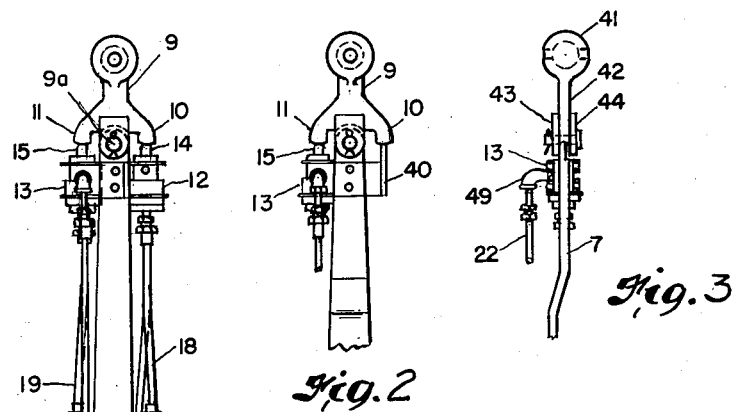
Fig. 2
Fig. 3
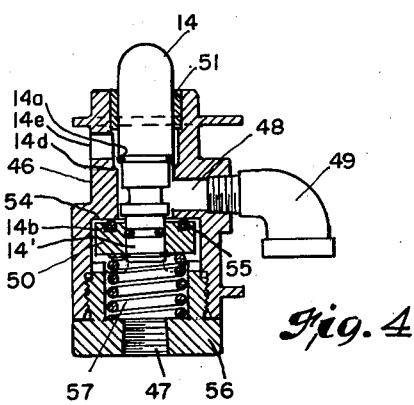
Fig. 4
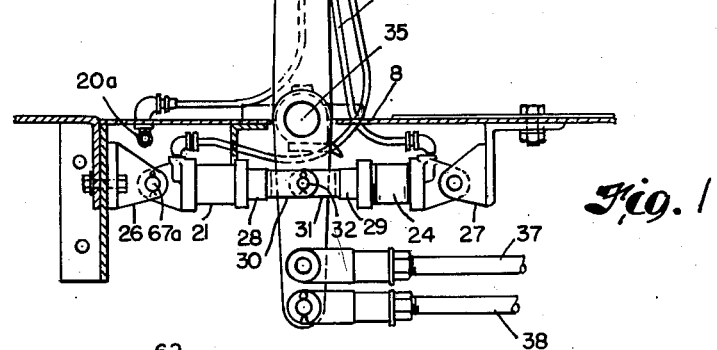
Fig. 1
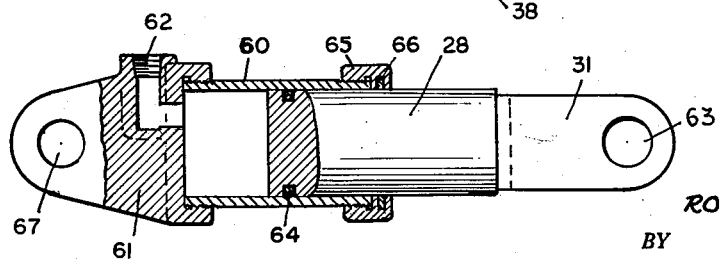
Fig. 5
INVENTOR.
ROY H. ZEILMAN
BY
Oberlin & Limbach
ATTORNEYS.

Patented Apr. 21, 1953

2,635,582

UNITED STATES PATENT OFFICE 2,635,582

MANUAL CONTROL DEVICE WITH POWER BOOSTER

Roy H. Zeilman, Elyria, Ohio, assignor to The Thew Shovel Company, Lorain, Ohio, a corporation of Ohio Application January 17, 1950, Serial No. 139,031

4 Claims. (Cl. 121—41)

This invention relates, as indicated, to control devices, and is more particularly concerned with machinery and equipment and the like in which a part of the operating mechanism thereof is controlled by a manually manipulated handle and this invention is more especially concerned with the provision of a booster mechanism which under certain circumstances is brought into operation for the purpose of assisting in the movement in the desired direction of the said operating handle, which is normally moved by and under control of the operator of the machine.

There are many types of equipment such as, for example, hoisting machines, power shovels, cranes and the like wherein the operating lever moved manually by the operator is functional to control a clutch, brake or some other device which requires the application of different degrees of force for different stages of operation of the machine. Thus either the brake or clutch lever on a hoisting machine is many times required to be applied for an "inching" movement of the equipment whereas at other times it is required that the lever be applied with full force to either set the brake or clutch.

As the equipment increases in size or as the parts are more heavily loaded, the force required to operate levers described to their fullest extent is so great that the work of operating them becomes exceedingly tiresome. For the operation of certain types of machinery it has never been feasible thus far to entirely supplant manual operation by means of mechanical or electrical operation. There are many types of equipment wherein the actuation of the clutch or brake, for example, can best be accomplished by the manual "feel" of an experienced worker. This type of manual control can usually not be supplied by any mechanical or electrical means excepting with devices which are extremely complicated and thus expensive to construct and maintain.

It is the principal object of my invention to provide a control device wherein the manual operable handle of the machine of the type described above has associated therewith a booster mechanism which helps to move the lever only after the force required to move such lever exceeds a predetermined minimum. In this way the booster mechanism in no way interferes with the "feel" by which the skilled operator may manually control the operation of the machine and at the same time, however, so assists the operator that he is relieved from the burden of the heavy loads required to be placed on the operating handle.

It is a further object of my invention to provide an apparatus of the character described which is extremely simple in its construction and may be manufactured and maintained at relatively low cost.

It is a further object of my invention to provide an apparatus of the character described which is effective to assist in the movement of the operating lever in either direction.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

In the inset of the drawing Fig. 1 is a side elevational view of one form of the operating lever having in association therewith a device which is an embodiment of one form of my invention.

Fig. 2 is a fragmentary view of a portion of a handle similar to that illustrated in Fig. 1, but shows a modified form of construction.

Fig. 3 is a side elevational view of the structure illustrated in Fig. 2.

Fig. 4 is an enlarged sectional view of one of the valve units which is shown associated with the upper end of the handle illustrated in Fig. 1.

Fig. 5 is a sectional view of one of the fluid pressure motors shown associated with the lower end of the handle illustrated in Fig. 1.

Referring now more specifically to the drawing and more especially to Fig. 1, the construction here illustrated as one embodiment of my invention is shown to include a handle generally indicated at 7 which is mounted on a platform 8 of a machine by means of a trunnion 35 about which the handle 7 may be pivoted. The upper end of the handle 7 carries a hand grip portion 9 by which the handle 7 is usually manually controlled. The hand grip portion 9 is pivotally secured to the upper end of the handle 7 by means of the trunnion pin 9a. Mounted on opposite sides of the handle 7 adjacent its upper end are laterally extending projections 12 and 13, each of which supports a valve unit, the construction of which is most clearly illustrated in Fig. 4 and the details of construction and mode of operation of which will presently be described. It is sufficient at this time to point out that the valve members as illustrated in Fig. 4 are each provided with an upwardly projecting actuating knob 14. On the left hand valve shown mounted on the upper end of the handle 7 the knob is indicated by the reference character 15. The manually gripped portion 9 of the handle is provided with lateral projections 10 and 11 which are adapted to respectively engage the knobs 14 and 15 as the portion 9 is rocked in opposite directions about the axis of the pin 9a on which it is pivotally supported.

The bottom of each of the valves is provided with a pipe connection opening generally indicated at 47 and into the valve mounted on the right hand side of the handle in Fig. 1 a fluid supply line 18 is threaded and into the opening 47 and to the valve mounted on the left hand side of the handle 7 there is secured the fluid supply line 19.

The fluid supply lines 18 and 19 are connected by suitable coupling means to a flexible conduit 20 which leads away from the handle 7 to a fluid supply line 20a carried by the base of the machine. The fluid supply line 20a is connected to a suitable source of fluid under pressure. Since the provision of fluid under pressure is conventional, it is believed unnecessary to show such fluid pressure supply means.

At this time it should be pointed out that the apparatus illustrated in the description as illustrative of my invention is designed to operate on compressed air so that the fluid supply line 20a in the illustrated embodiment of the invention is connected to a compressed air tank.

Extending from the body of each of the valves is a passage 48 which is shown provided with a conventional coupling 49. To the coupling 49 on the left hand valve on the lever 7 is secured a conduit 22, which at its lower end is connected to a fluid pressure motor 21. To the coupling 49 on the valve on the right hand side of the lever 7 is connected a flexible conduit 23 which at its lower end is connected to the fluid pressure motor 24.

The fluid pressure motors 21 and 24 are identical in construction, said motor 21 comprising a piston 28 which is reciprocable in a cylinder 60, which at one end carries a packing gland ring 65 and packing ring 66 closely embracing the periphery of piston 28. The other end of the cylinder 60 is threadably secured in a block 61 which is provided with a passage 62 adapted to receive a conduit such as 22 (conduit 23 in the case of the motor 24) and provide communication to the interior of the cylinder 60. An ear on the end of the block 61 is provided with an opening 67 adapted to receive a pin 67a and by which said motor 21 may be pivotally secured to a block such as 26 (27 in the case of motor 24) carried by the base of the machine. The extended end 31 of the piston 28 is provided with a transverse opening 63 which is adapted to receive a pin 32 by which one or both motors 21 and 24 may be secured to the lower end of the lever 7. Motor 24 is, as indicated, identical with motor 21 excepting that its piston 29 extends toward the piston 28 of the motor 21 so that both pistons may be secured to the lever 7 by pin 32.

At its lower end the lever 7 has pivotally secured thereto rods 37 and 38 which lead from the lever to the machine element to be controlled by the lever.

Referring now more specifically to Fig. 4, there is here illustrated one of the valves shown associated with the upper end of the handle 7. Such valve comprises the body generally indicated at 46, the body being substantially tubular in form and provided at its lower end with a cylindrical recess, the open lower end of which is closed by a screw plug 56. The upper end of the body 47 likewise has a cylindrical opening in which is mounted a bearing ring 51 through which extends the knob 14 previously referred to. The knob 14 is generally cylindrical in form with the lower end thereof of reduced diameter and extending through an annular valve member 50. The lower end of the knob 14, where it passes through the annulus 50, is provided with a peripheral groove adapted to receive a retainer such as a snap ring. The stem 14' of the knob 14, where it passes through the annulus 50, has a peripheral groove 14b in which is positioned a pressure seal so that pressure may not pass the reduced section 14' where it passes through the valve annulus 50.

The upper end of the cylindrical cavity within the valve body 46 is finished off as at 54 to provide a valve seat with which a sealing ring indicated at 55 and carried by the annulus 50 may have contact.

The annulus 50 is urged upwardly and the sealing member 55 is urged against the seat 54 by means of a spring 57 which is under compression by having engagement with the inner face of the plug 56. It will be observed that the strength of the spring 57 or, in other words, the initial loading placed on the spring 57, as the screw plug 56 is inserted, determines the amount of pressure or axial force necessary to be applied to the knob 14 for the purpose of unseating the valve which comprises the parts 54 and 55.

Intermediately of its ends and adjacent a point of reduction in its outside diameter, the knob 14 carries a sealing ring 14a. In the adjacent end of and normally axially spaced from such sealing ring, the valve casing 46 is provided with an annular seat 14d with which the seal ring 14a is adapted to engage as the knob 14 is forced downwardly against the influence of the spring 57. The casing of the valve is provided with a vent 14e for the purposes hereinafter more fully explained.

The mode of operation of the described apparatus is briefly as follows:

With a valve such as that illustrated in Fig. 4 mounted on each side of the upper end of the handle 7 so that the projection knobs 14 and 15 of such valves are in engagement with the projections 10 and 11 respectively on the handle portion 9, the operator by gripping the handle portion 9 may move the handle manually unless movement of the handle 7 should be opposed by a force such that the compression of the spring 57 in one of such valves will permit a rotation of the terminal handle portion 9. Let us assume that the operator stands to the left of the handle illustrated in Fig. 1 and shoves the upper end 9 of such handle toward the right. This will have a tendency to depress the knob 14. In one form of construction, which has been used successfully in earth moving equipment, the strength of the spring 57 has been such that the end 9 of the handle is not permitted to rock until the operator pushes against the handle with a force of 15 lbs. Whenever this predetermined load is applied to the handle portion 9 causing the spring 57 in the valve to be compressed, the first movement of the knob 14 downwardly moves sealing member 55 from the seat 54. When this occurs air under pressure applied to the valve through the opening 47 from the conduit 20 has two avenues of flow. First, it may pass through the passage 48, the connection 49, the conduit 23 and hence to the fluid pressure motor 24. The other avenue of flow is through the constricted passage around the valve seat 14d and thence out of the valve body through the vent 14e. If the operator thus pushes on the end handle with sufficient force to cause an unseating of the valve member 55 by compressing the spring 57, a supplied amount of air under reduced pressure is admitted to the motor 24 and such motor gradually picks up and offers assistance to the operator in his seeking to rotate the handle clockwise about the axis of its pivotal point at 35. Now as the operator continues the application of pressure forwardly on the upper end of the handle 9 indicating a desire for a future clockwise rotation of the handle 7 this will cause the knob 14 to descend a greater distance, thus further restricting the escape passage for the air past the seat 14d building up pressure in the motor 24 and thus increasing the assistance which the booster motor 24 provides the operator in his effort to rotate the handle 7 clockwise. Then if the operator still continues forward pressure on the handle 9 to a point where the sealing ring 14a is brought into engagement with the seat 14d then the full pressure of the air in the supply line 20a is led to the motor 24 and full assistance by such booster jack is provided in rotating the handle 7 clockwise.

Should the operator discontinue movement of handle portion 9, the pressure of the fluid yet acting on the piston 28 or 29 will cause a continued actuation of handle 7 about pivot 35 until the depressed knob 14 or 15 can shift to a position closing communication between the fluid pressure supply line and the motor 21 or 24 which had been assisting the operator in the actuation of handle 7.

If now the operator releases the pressure on the handle portion 9 the same sequence of events just described will occur, but in reverse order until finally the member 55 is seated on the seat 54 whereupon the air in the motor 24 is vented to the atmosphere through the passages 48 and 14e so that the operator will then again have the handle 7 entirely under his manual control.

From the foregoing description of the invention it will be observed that the booster mechanism is effective not only for the purpose of providing assistance to the operator at the time when he needs help and when no longer the "feel" of the machine is important, but also, and of great importance, is the fact that the booster mechanism cuts in gradually and cuts out gradually so that at no time does the operator have a feeling that the control of the machine is either suddenly taken away from him or suddenly thrust back in his hands.

The modifications illustrated in Fig. 2 and Fig. 3 are substantially identical with that illustrated in Fig. 1. These modifications provide only one valve such as that illustrated in Fig. 4 and accordingly, the lower end of the handle 7 would be provided with only one booster motor so that the operator would in this instance move the handle in only one direction, i. e. counter-clockwise, as viewed in Fig. 2. In such construction the handle portion 9 may be prevented from rotating clockwise by the provision of a single abutment 40 replacing one of the valves for engagement with the projection 10.

In Fig. 3 reference characters 41 through 44 have been applied to the handle portion 9 to denote respectively the grip, stem, body and base of such handle portion.

When utilizing a form of construction with only one valve, as illustrated in Figs. 2 and 3, such construction is useful in those instances where there is need to apply a force in one direction only.

As previously indicated, the illustrated embodiment of the invention is primarily designed for use with compressed air. Steam or other compressible fluids may be used in place of air in the apparatus illustrated. If it should be desired to use an incompressible fluid, such as oil, the only change which would be required in the illustrated apparatus would be to supply a return conduit which would lead the oil from the passage 14e back to the supply tank at atmospheric pressure.

In the disclosed embodiment and the invention, reference has been made to the fact that the strength of the springs 57 in the valves is such that they will yield when a force of about 15 lbs. is applied by the operator against the handle portion 9. This value has been found in actual practice to be about the most satisfactory for most purposes. A force of 10 to 20 lbs. or even 5 to 30 lbs. can be used depending upon the desires of the operator and the type of equipment under control. Generally, however, a force of about 15 lbs. will be found to be most satisfactory. The location of the booster motors is not particularly critical. In the illustrated embodiment of the invention they have been placed below the level of the floor of the machine on which the operator stands in order that they may be out of the way of the operator. The only factor influencing their location is the distance away from the fulcrum point 35 which will determine the size of the cross-sectional area of the piston thereof as compared with the unit pressure of the actuating fluid and the amount of assistance which the booster motors are designed to supply.

It should be understood that the illustrated embodiments of my invention are but a few of the various forms which such invention may have and that various changes may be made in the illustrated embodiments without departing from the spirit of the invention. Thus, for example, it is within the contemplation of my invention to utilize electromagnets in place of the fluid pressure motors 21 and 24, in which instance the knob 14 instead of controlling a fluid supply line would control an electrical circuit.

I claim:

1. In combination, a reciprocable member, a fixed support, a manually operable actuating handle having a main body part pivotally connected between its ends to said support and at one end to said member and a pivotal terminal part at the other end of said body part by which said handle is normally manipulated in opposite directions to correspondingly move said member, a pair of opposed single acting piston type fluid pressure motors each having one of its components mounted on said support and the other of its components connected to said body part at a point radially spaced from the pivotal connection of said body part to said support, and a pair of valves carried by said handle on opposite sides of the pivotal connection between said body and terminal parts and operatively connected with the respective motors to alternately admit fluid under pressure thereinto and vent the same, each said valve comprising a valve body formed with an inlet port for fluid under pressure, an outlet port in communication with the associated motor, and a vent port, and a spring actuated valve member engaged with one of said body and terminal parts to yieldably resist pivotal movement of said terminal part with respect to said body part, each said valve member being arranged to close communication between such inlet and outlet ports and to vent the associated motor through such outlet and vent ports during manual manipulation of said actuating handle and being operative upon exertion of force thereon through said terminal part in excess of the yieldable resistance to open communication between such inlet and outlet ports while closing communication between such outlet and vent ports whereby the associated motor is operated to augment continued movement of said handle and of said reciprocable member.

2. In combination, a reciprocable member, a fixed support, a manually operable actuating handle having a main body part pivotally connected to said support and engaged with said member to reciprocate the latter responsive to oscillation of said main body part and a pivotal terminal part by which said handle is normally manipulated in opposite directions to correspondingly reciprocate said member, a pair of single acting piston type fluid pressure motors respectively arranged to actuate said body part in opposite directions and each having one of its components mounted on said support and the other of its components connected to said body part at a point radially spaced from the pivotal connection of said body part to said support, and a pair of valves carried by said handle on opposite sides of the pivotal connection between said body and terminal parts and operatively connected with the respective motors to alternately admit fluid under pressure thereinto and vent the same, each said valve comprising a valve body formed with an inlet port for fluid under pressure, an outlet port in communication with the associated motor, and a vent port, and a spring actuated valve member engaged with one of said body and terminal parts to yieldably resist pivotal movement of said terminal part with respect to said body part, each said valve member being arranged to close communication between such inlet and outlet ports and to vent the associated motor through such outlet and vent ports during manual manipulation of said actuating handle and being operative upon exertion of force thereon through said terminal part in excess of the yieldable resistance to open communication between such inlet and outlet ports while closing communication between such outlet and vent ports whereby the associated motor is operated to augment continued movement of said handle and of said reciprocable member.

3. The combination of claim 2 wherein each of said valve members comprises a plunger reciprocable in the respective valve body and having axially spaced seating portions alternately engaged with seats in said valve body located between such inlet and outlet ports and between such outlet and vent ports.

4. The combination of claim 3 wherein the seating portions of said valve members are spaced further apart than the seats in said valve bodies whereby, during movement of said valve members, a progressively decreasing portion of the fluid under pressure is vented to achieve a gradually increasing power boost effect on the manual actuation of said handle.

ROY H. ZEILMAN.

References Cited in the file of this patent

UNITED STATES PATENTS

| Number | Name | Date |
|---|---|---|
| 1,365,347 | Schneider | Jan. 11, 1921 |
| 1,385,658 | Blasiar | July 26, 1921 |
| 1,765,069 | Gibson | June 17, 1930 |
| 1,824,296 | Rawson | Sept. 22, 1931 |
| 1,928,915 | Stout | Oct. 3, 1933 |
| 2,138,148 | Eckert | Nov. 29, 1938 |
| 2,360,542 | Berry | Oct. 17, 1944 |
| 2,380,705 | Proctor | July 31, 1945 |

FOREIGN PATENTS

| Number | Country | Date |
|---|---|---|
| 397,274 | Great Britain | Aug. 24, 1933 |